(12) United States Patent
Lagerwaard

(10) Patent No.: US 11,717,929 B2
(45) Date of Patent: Aug. 8, 2023

(54) FLOOR TREATMENT APPARATUS

(71) Applicant: Edward Johannes Lagerwaard, Dordrecht (NL)

(72) Inventor: Edward Johannes Lagerwaard, Dordrecht (NL)

( * ) Notice: Subject to any disclaimer, the term of this patent is extended or adjusted under 35 U.S.C. 154(b) by 0 days.

(21) Appl. No.: 17/059,865

(22) PCT Filed: May 29, 2019

(86) PCT No.: PCT/NL2019/050312
§ 371 (c)(1),
(2) Date: Nov. 30, 2020

(87) PCT Pub. No.: WO2019/231323
PCT Pub. Date: Dec. 5, 2019

(65) Prior Publication Data
US 2021/0260714 A1   Aug. 26, 2021

(30) Foreign Application Priority Data

May 29, 2018  (NL) ...................................... 2021007
Sep. 12, 2018  (NL) ...................................... 2021609

(51) Int. Cl.
*B24B 7/18*   (2006.01)
*A47L 9/04*   (2006.01)
(Continued)

(52) U.S. Cl.
CPC ............ *B24B 7/186* (2013.01); *A47L 9/0411* (2013.01); *A47L 11/1625* (2013.01);
(Continued)

(58) Field of Classification Search
CPC ....... B24B 55/06; B24B 55/10; B24B 55/102; B24B 55/105; B24B 7/18; B24B 7/186
See application file for complete search history.

(56) References Cited

U.S. PATENT DOCUMENTS 2,923,107 A    2/1960  Biasoni
3,146,559 A *  9/1964  Wilkinson .............. B24B 7/186
                                                    451/353
(Continued)

FOREIGN PATENT DOCUMENTS

CN       201077007       6/2008
EP         2036668       3/2009
(Continued)

*Primary Examiner* — Joel D Crandall
(74) *Attorney, Agent, or Firm* — Marcus C. Dawes

(57) ABSTRACT

The present invention relates to a floor treatment apparatus (1) and method for treating a floor. The apparatus comprises: •—a housing (10) comprising a top plate (11), and •—a drive system comprising: •—a transmission (21) arranged above the top plate (11), the transmission (21) comprising a transmission shaft (22) passing through an aperture in the top plate (11), •—a motor (23) attached to the transmission (21), the motor (23) arranged above the top plate (11), •—a rotatable drive plate (24) attached to the transmission shaft (22) and positioned below the top plate (11), and •—a coupling member (25) attached to a bottom of the drive plate (24) and arranged to couple a treatment member (26) for treating a floor surface, by engagement on said floor surface, to the drive plate (24), wherein the floor treatment apparatus comprises an open-ended tubular casing extending from a central aperture in the drive plate (24) through the housing (10) to an outlet opening (15) of the housing (10) to which a fluid conduit is connectable, wherein the casing is arranged for a fluid to flow through it.

12 Claims, 14 Drawing Sheets

Figure 1:
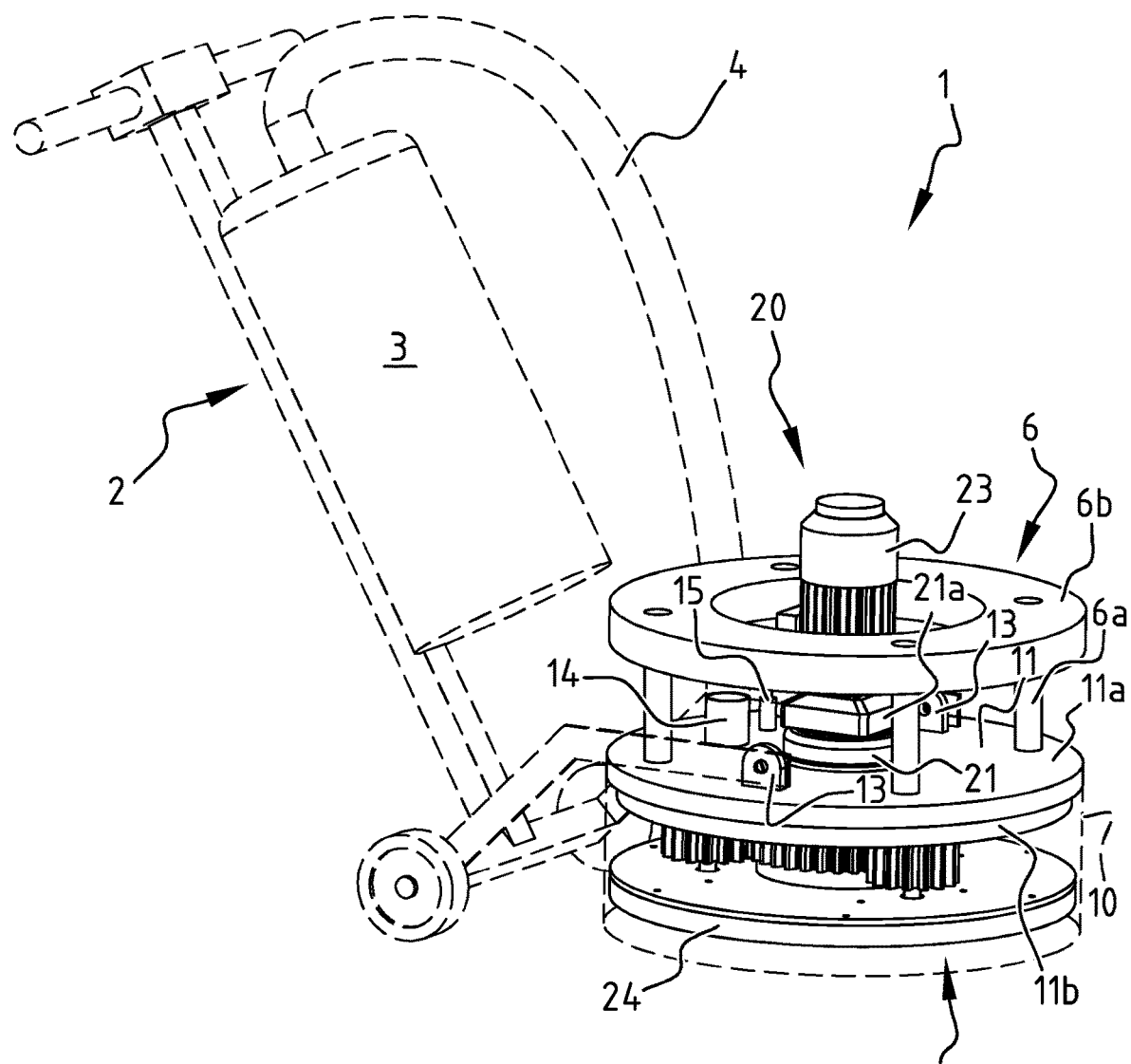

(51) Int. Cl.
*A47L 11/40* (2006.01)
*A47L 11/162* (2006.01)
*A47L 11/202* (2006.01)
*B24B 45/00* (2006.01)
*B24B 47/12* (2006.01)
*B24B 57/02* (2006.01)
*F16H 1/28* (2006.01)

(52) U.S. Cl.
CPC ....... *A47L 11/2025* (2013.01); *A47L 11/4069* (2013.01); *B24B 45/006* (2013.01); *B24B 47/12* (2013.01); *B24B 57/02* (2013.01); *F16H 1/28* (2013.01)

(56) References Cited

U.S. PATENT DOCUMENTS

| | | | | |
|---|---|---|---|---|
| 5,784,754 A * | 7/1998 | Roden | ................ | A47L 11/4075 15/385 |
| 6,151,748 A * | 11/2000 | Earhart, Jr. | ......... | A47L 11/4075 15/322 |
| 6,238,277 B1 | 5/2001 | Warren | | |
| 7,261,623 B1 * | 8/2007 | Palushi | ................ | B24B 47/12 451/353 |
| 7,416,478 B2 * | 8/2008 | Vankouwenberg | ... | B24B 41/047 451/352 |
| 8,147,297 B2 * | 4/2012 | Hamm | ................ | B24B 41/047 451/353 |
| 8,510,902 B2 * | 8/2013 | Kappos | ............... | A47L 11/4069 15/387 |
| 9,107,557 B2 * | 8/2015 | Studebaker | ......... | A47L 11/4044 |
| 9,402,523 B2 * | 8/2016 | Studebaker | ......... | A47L 11/4069 |
| 2010/0267316 A1 * | 10/2010 | Silver | ................ | B24B 41/047 451/353 |
| 2012/0270483 A1 | 10/2012 | Seong | | |
| 2013/0084782 A1 * | 4/2013 | McCutchen | ............ | B24B 7/186 451/28 |
| 2016/0136772 A1 * | 5/2016 | Littlefield | ............... | B24B 7/186 451/41 |

FOREIGN PATENT DOCUMENTS

| | | | | |
|---|---|---|---|---|
| KR | 20090030458 | 3/2009 | | |
| WO | 2006119518 | 11/2006 | | |
| WO | WO-2012012820 A1 * | 2/2012 | .......... | B24B 23/022 |

* cited by examiner

FLOOR TREATMENT APPARATUS

The present invention relates to a floor treatment apparatus that comprises a housing with a top plate, and a drive system having a transmission arranged above the top plate. The transmission comprises a transmission shaft passing through an aperture in the top plate. Furthermore, a motor is attached to the transmission, with the motor being arranged above the top plate. Also, the apparatus has a rotatable drive plate attached to the transmission shaft and positioned below the top plate, and a coupling member attached to a bottom of the drive plate and arranged to couple a treatment member for treating a floor surface, by engagement on said floor surface, to the drive plate.

The present invention further relates to a coupling member for a floor treatment apparatus, a method for treating a floor, and a use of a floor treatment apparatus.

Commonly known floor treatment apparatuses are usually mounted on a movable chassis that can travel along a floor surface. The chassis of the apparatus can be provided with wheels and a handle so as to be movable by an operator around a work area. Alternatively, the apparatus can be provided with a motorized chassis, such as a cart, and driven. The treatment apparatus typically comprises a motor which drives a rotatable drive plate and optionally one or more rotatable treatment discs through a drive shaft. The drive plate and/or treatment disc(s) comprise, attached to a bottom side thereof, a treatment tool for treating the floor when in contact therewith. During the treatment, particles will be released from the floor due to the contact with the grinding motion of the treatment discs.

This grinding dust comprises small particles that are often spread throughout the working area and beyond. These small particles pose a health risk for the user of the apparatus. In addition, the grinding dust may cause damage to objects, such as electronic devices, in the vicinity of the treatment area. Furthermore, the grinding dust may also result in damage to the inner parts of the apparatus, leading to a rapid decay of the internal of the apparatus. As a result, the floor is often treated with fluid before and/or simultaneously with the grinding process to reduce dust formation.

A disadvantage of providing fluid is the formation of a sludge that is difficult to remove from the apparatus, the treated floor and/or objects in the vicinity. Therefore, an improved floor treatment apparatus is required, which eliminates or at least reduces the formation and/or spreading of dust during the grinding, sanding and/or polishing process for both dry and wet processes.

To that end, the invention provides a floor treatment apparatus, the apparatus comprising:
 a housing comprising a top plate, and
 a drive system comprising:
  a transmission arranged above the top plate, the transmission comprising a transmission shaft passing through an aperture in the top plate,
  a motor attached to the transmission, the motor arranged above the top plate,
  a rotatable drive plate attached to the transmission shaft and positioned below the top plate, and
  a coupling member attached to a bottom of the drive plate and arranged to couple a treatment member for treating a floor surface, by engagement on said floor surface, to the drive plate,
 characterized in that the floor treatment apparatus comprises an open-ended tubular casing extending from a central aperture in the drive plate through the housing to an outlet opening of housing to which a fluid conduit is connectable, wherein the casing is arranged for a fluid to flow through it.

An advantage of the apparatus according to the invention is that it provides a central removal for dust and particles that are produced during the grinding process, therewith reducing the spreading thereof. The central removal will, during operation, contain a flow of air containing dust and/or particles.

Another advantage is that, due to the central removal of the grinding products, such as dust and particles, it can easily be retrieved and stored for later disposal.

Yet another advantage of having a casing that extends between the central aperture in the drive plate and the outlet opening in the housing is that the grinding products, such as dust and particles, are drawn away from the treatment members and the connection thereof with the apparatus. As a result, the amount of dust collection on parts of apparatus is reduced and the operational up-time of the apparatus is increased.

A further advantage is that the casing and the channel it forms may also be advantageously used for channeling a fluid if that would be desirable by the user, for example for a specific type of floor to be treated.

The tubular casing can be formed in various ways. This may for example be a (tubular) conduit having a number of outer ends that are connected to one or more apertures in a central part of the drive plate and that extend from those apertures to the outlet in the housing. It is preferred that the tubular casing is an open space in a hollow opening of the centrally placed gear that is connected to the transmission shaft or that the tubular casing at least comprises a hollow space placed near a central part of the apparatus through which the transmission shaft extends.

It is preferred that the casing and the channel together from a substantially air tight connection that, when in use, is subjected to a near vacuum or vacuum in order to transfer/remove the grinding dust that is produced by the grinding. This reduces the amount of dust ejected to the surroundings even further.

In an embodiment according to the invention, the top plate of the housing may comprise a number channels that extend from the outlet opening of the housing to an end portion, wherein the end portion is connectable to the central aperture of the casing.

The central aperture is preferably connected to one or more fluid channels that extend in the top plate towards the outlet opening in the housing. This allows the outlet opening to be positioned at virtually any position in the top plate of the housing and therewith provides additional flexibility in the lay-out of the apparatus as such. The top plate may in this case comprise a single plate having the fluid channels provided therein, or may comprise two separate layers that are connected with each other. In case of two layers, the top plate preferably comprises an upper layer and a lower layer in which the fluid channels are provided. The lower layer may have a circular form, yet may also be provided as a rectangular, square or orthogonal form.

In an embodiment according to the invention, the floor treatment apparatus further comprises suction means attached to the casing, the suction means being arranged to suck up particles that have come off the floor surface after treatment and to transport them through the casing to outside to the housing.

A beneficial effect is that the suction is actually performed close to the origin of the parts. This improves the suction of undesired parts, thereby improving working conditions and maintaining a relatively clean working environment. The suction means may emanate in, near or at the treatment member and preferably close to the floor surface to be treated.

Preferably, the floor treatment apparatus further comprises fluid supply means attached to the casing, the fluid supply means being arranged to supply fluid to the floor surface to be treated via the casing through the central aperture in the drive plate. Due to the suction means dust is prevented from entering the gears. Using the fluid supply means, for instance water can be supplied to the floor surface during wet sanding, thereby reducing sanding dust and improving the efficiency of sanding tools. Similarly, the fluid supply means are useable during grinding and/or polishing to the effect of reducing grinding/polishing dust and improving the efficiency of respectively the grinding and/or polishing tools.

In an embodiment according to the invention, one or more of the coupling members are fixedly connected to the drive plate, thus forming a single assembly to which the treatment members are coupleable.

An advantage of having one or more of the coupling members fixedly connected to the drive plate is that the total costs for the apparatus is reduced compared to having releasably or detachable coupling members. This is for example interesting for companies that only perform a single type of floor treatment and thus substantially always require similar characteristics.

Another advantage is that the complexity of the apparatus is reduced due to the reduced number of separate parts that is required.

In an embodiment according to the invention, the coupling member comprises a quick release mechanism arranged for releasably attaching the coupling member to the drive plate.

A beneficial effect of the coupling member comprising a quick release mechanism is that it enables a variety of different treatment members to be used as well as different coupling members on one and the same machine, i.e. the floor treatment apparatus, through simple and rapid replacement of the coupling member. As a result, inter alia the treatment member, the size of the working surface and the total working width of the machine, can be configured in accordance with the intended treatment activity of the machine. In this way, the machine can be adapted to the requirements of the intended treatment process in a quick and easy manner. In particular, no compromise needs to be made between a large active area which improves the levelling effect of the machine or small active areas which allow the treatment members follow the floor surface better and are therefore more suitable for polishing applications.

In an embodiment, the quick release mechanism arranged for releasably attaching the coupling member to the drive plate is arranged for releasably attaching the coupling member to the drive plate without the use of attachment tools, and wherein the quick release mechanism may comprise a magnetic coupling. An advantage of a quick release mechanism that is operable without the use of attachment tools is that an increased speed of changing the coupling member can be achieved. This allows rapid changing between coupling members with different characteristics. Furthermore, it reduces the amount of equipment that needs to be carried to the treatment site.

Preferably, the quick release mechanism comprises a magnetic coupling, which has the advantage that it provides excellent coupling and can simultaneously be (very) quickly released for changing the coupling members. Both permanent magnets and/or non-permanent magnets can be used in the magnetic coupling. The magnets used in the magnetic coupling may be provided on or in the coupling member and/or may be provided on the drive plate.

However, other options, which include a bolt-and-nut connection, a click-connection and/or a bayonet-connection, are possible as well.

In a preferred embodiment, the coupling member is arranged for rotatably attaching the treatment member to the bottom surface thereof, such that the treatment member is rotatable relative to the coupling member around a rotation axis perpendicular to the plane of the drive plate.

A beneficial effect of the treatment member being rotatable relative to the coupling member is that the treatment member obtains a rotational movement in addition to its translational movement due to the rotation of the drive plate. In this way, the effectivity of the treatment member in the treatment process can be improved.

In a further preferred embodiment, the coupling member comprises bearing means with the interposition of which the treatment member is rotatably attached on the bottom surface of the coupling member. The bearing means allows the treatment member to obtain an extra rotational speed relative to the coupling member due to friction between the treatment member and the surface of the floor to be treated.

In a preferred embodiment, the floor treatment apparatus further comprises a sun gear attached to the top of the drive plate and fixed in position relative thereto, and at least one planet gear rotatably attached to top of the drive plate. In this embodiment, the treatment member is rotatably attached to the bottom of the coupling member by attachment of the treatment member to the planet gear by means of an axle extending from the planet gear through the drive plate and the coupling member to the treatment member, wherein the planet gear engages the sun gear, such that as the drive plate is driven by the transmission shaft, the sun gear rotates the planet gear, thereby rotating the treatment member relative to the coupling member.

In this way, the treatment member obtains a rotational movement relative to the coupling means in a driven manner, i.e. the treatment member is driven by the motor via the transmission shaft and the gearing on top of the drive plate.

In a further preferred embodiment, the coupling member comprises a transmission comprising an input gear and an output gear, the input gear comprising an input shaft attached to the sun gear or planet gear and the output gear comprising a shaft attached to the treatment member.

In this embodiment, the treatment member can be driven to rotate relative to the coupling member, which in turn rotates relative to the drive plate. The drive system thus enables various configurations as to the direction of rotation, the rotational speed and the rotation centre of the treatment member as well as with regard to the active working area of the floor treatment apparatus.

A beneficial effect of the apparatus according to the present invention is the flexibility to choose different drives or drive systems, and treatment members (tools). This enables adjusting the apparatus to a specific operation/application.

In this respect it is noted that in an alternative embodiment, the coupling member comprises a transmission comprising an input gear and an output gear, wherein the input gear comprises an input shaft that is operatively connected to the transmission shaft, for example using a chain or belt transmission, and the output gear comprising a shaft attached to the treatment member.

In this alternative embodiment, the treatment member can be driven to rotate relative to the coupling member, which in turn rotates relative to the drive plate. The drive system thus enables various configurations as to the direction of rotation, the rotational speed and the rotation centre of the treatment member as well as with regard to the active working area of the floor treatment apparatus.

A beneficial effect of the apparatus according to the present invention is the flexibility to choose different drives or drive systems, and treatment members (tools). This enables adjusting the apparatus to a specific operation/application.

In an embodiment, a top surface of the coupling member and/or the bottom surface of the drive plate is magnetic. A beneficial effect is that a coupling member of one type, e.g. a coupling member with built-in bearing means, can be easily replaced, i.e. without the use of attachment tools, by a coupling member of another type, e.g. a coupling member with a built-in transmission gearing.

In an embodiment according to the invention, the housing may additionally comprise a weight balancing system that is mounted on the top plate, wherein the weight balancing system comprises a support mount configured to support weight elements and a number of weight removeable elements that are positioned on the support mount.

An advantage of providing an additional weight balancing system is that the weight of the apparatus, and more specifically the pressure exerted on the coupling and treatment members can be increased or decreased. As a result, the pressure exerted by the treatment members on the floor to be treated is adaptable to different types and characteristics of the floor to be treated.

In an embodiment according to the invention, the drive plate may be provided with a dust cover or dust cap that extends from the drive plate towards a floor to be treated and is configured to limit the spreading of grinding dust throughout a room having the floor to be treated.

It is noted that another problem of commonly known apparatus, is that the motor is commonly an electric motor. Such an electric motor is designed such that when it is connected directly to the mains, it will start to run at its nominal speed. However, the speed of rotation of the electric motor can be controlled by lowering the current frequency or by increasing it by means of a frequency regulator. This function is essential for floor treatment apparatuses, because each operation requires a different rotational speed. At an increased frequency a higher rotational speed is obtained and likewise a lower rotational speed is obtained at a reduced frequency. An important disadvantage of frequency control is, however, that at a frequency that exceeds the frequency of the power supply, the torque of the electric motor decreases considerably and at a lower frequency the cooling of the electric motor functions less well. The electric motor performs best at its nominal rotational speed.

In practice, this has the following consequences. The process of grinding floors often requires a low rotational speed and a high grinding pressure and therefore a high torque. However, by reducing the speed of rotation with the frequency regulator, the built-in cooling mechanism will function less well. As a consequence, the engine cools less well and the load the engine can handle is thereby reduced. On the other hand, the polishing of a floor often requires higher rotational speeds, but when a frequency regulator outputs a higher frequency than the mains the torque decreases inversely proportional to the rotational speed due to magnetic-field weakening.

Another way to influence the outgoing torque and rotational speed is to use a mechanical transmission. Today's floor treatment apparatuses typically use, in addition to a frequency regulator, a transmission to reduce the rotational speed and to increase the torque. The chosen configuration of such a transmission is however imposed by the intended purpose of the machine and is therefore predetermined by the manufacturer. A machine manufacturer usually assigns a number of properties to a floor treatment apparatuses in order to equip the apparatus as well as possible for the intended function.

Since the intended function of the apparatus imposes the design and configuration of the apparatus, the applicability of machine is very limited. The configuration with respect to, for example, the rotational speed, the size of the working surface, the total working width and the direction of rotation of the drive shafts of the treatment discs is fixed or only very limited adaptable.

It is therefore a second object of the invention to provide a floor treatment apparatus which is easily adaptable to its intended treatment activity.

To that end, the invention also relates to a floor treatment apparatus, the apparatus comprising:
a housing comprising a top plate, and
a drive system comprising:
a transmission arranged above the top plate, the transmission comprising a transmission shaft passing through an aperture in the top plate,
a motor attached to the transmission, the motor arranged above the top plate,
a rotatable drive plate attached to the transmission shaft and positioned below the top plate, and
a coupling member attached to a bottom of the drive plate and arranged to couple a treatment member for treating a floor surface, by engagement on said floor surface, to the drive plate,
characterized in that the coupling member comprises a quick release mechanism arranged for releasably attaching the coupling member to the drive plate A beneficial effect of the coupling member comprising a quick release mechanism is that it enables a variety of different treatment members to be used as well as different coupling members on one and the same machine, i.e. the floor treatment apparatus, through simple and rapid replacement of the coupling member. As a result, inter alia the treatment member, the size of the working surface and the total working width of the machine, can be configured in accordance with the intended treatment activity of the machine. In this way, the machine can be adapted to the requirements of the intended treatment process in a quick and easy manner. In particular, no compromise needs to be made between a large active area which improves the levelling effect of the machine or small active areas which allow the treatment members follow the floor surface better and are therefore more suitable for polishing applications.

Furthermore, the different treatment members allow the rotational speed and direction to be configured more specifically to the surface to be treated by adapting the treatment member to that surface to be treated.

According to a second aspect of the present invention, the apparatus provides a coupling member that is being attached to a bottom of a rotatable drive plate of the floor treatment apparatus, and the coupling member is furthermore arranged for rotatably attaching a treatment member for treating a floor surface under the drive plate to the bottom surface of the coupling member, such that the treatment member is rotatable relative to the coupling member around a rotation axis perpendicular to the plane of a drive plate. The coupling member provides the same or similar effects and advantages as described for the apparatus.

A further advantageous effect of the use of coupling members is the reduction in overall weight. For example, an apparatus according to the present invention has a weight of about 50-60 kg and with attached treatment members a weight of about 120 kg. Typically, a conventional apparatus has a weight in the range 160-500 kg. This provides a significant reduction in weight that improves handling of the apparatus and also improves the working conditions. It is noted that the apparatus may be a relatively light-weight ('floating') apparatus, yet may also be heavier apparatus having a built-in propulsion system. Depending on the type of apparatus, the weight may differ. In general however, the apparatus according to the invention has a lower weight than the known apparatus. Alternatively, the use of coupling members allow the capacity of the electric motor to be used more efficiently, which allows heavier apparatus to be manufactured.

In a preferred embodiment, the coupling member comprises a transmission comprising an input gear and an output gear, the input gear comprising an input shaft attached to a sun gear or planet gear being attached to the top of the drive plate of the floor treatment apparatus, and the output gear comprising a shaft attached to the treatment member.

According to a third aspect, the present invention provides a method for treating a floor, comprising the steps of providing a floor treatment apparatus according to the present invention, and treating a floor with the floor treatment apparatus. The method provides the same or similar effects and advantages as described for the apparatus and/or coupling member.

In a preferred embodiment, the method further comprises a step of selecting a coupling member of the floor treatment apparatus in accordance with a treatment requirement of the method.

In a further preferred embodiment, the coupling member comprises a coupling member according to the invention.

According to a fourth aspect, the present invention provides a use of a floor treatment apparatus according to the invention in a method for treating a floor according to the invention.

Figure 2A:
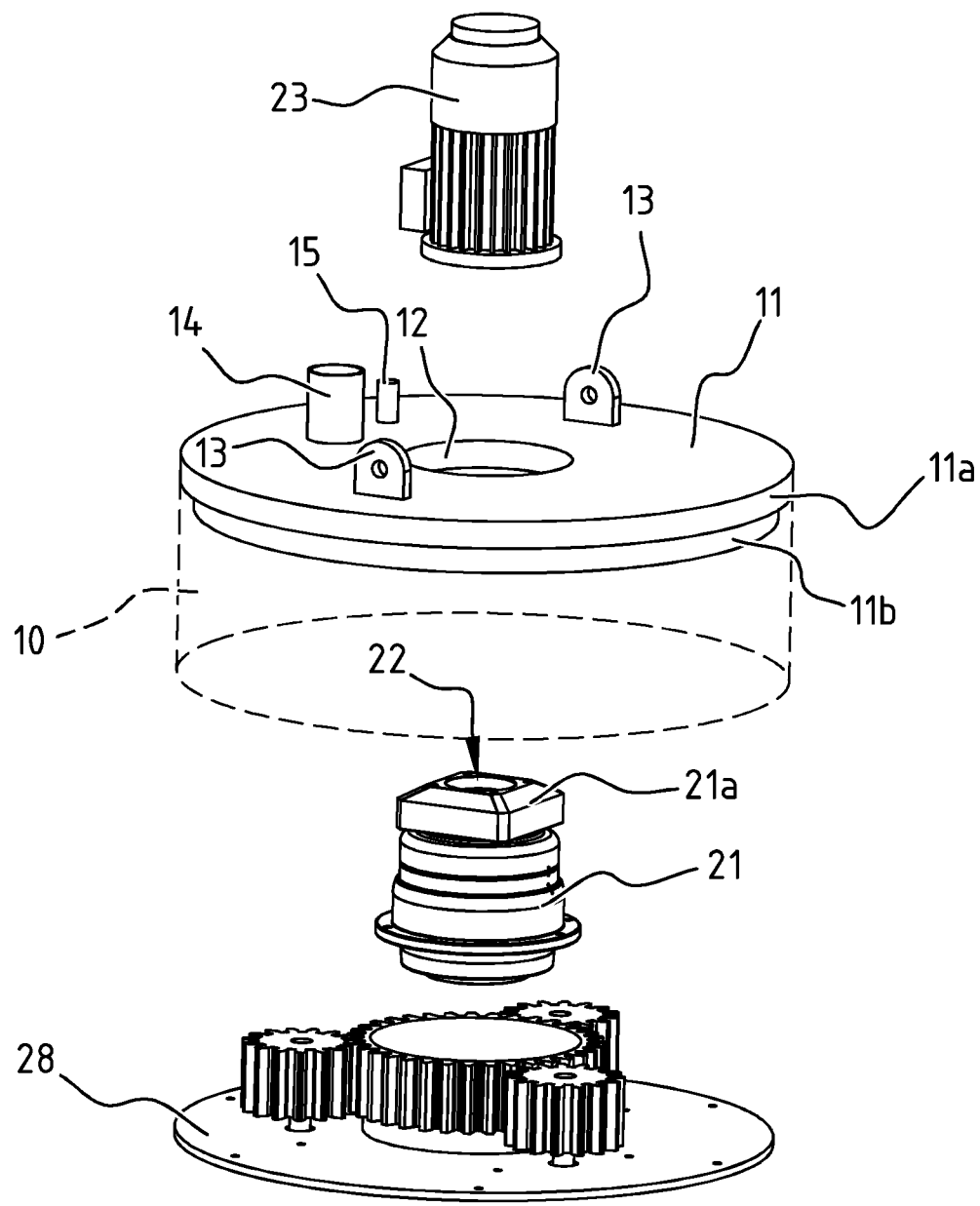
Figure 2B:
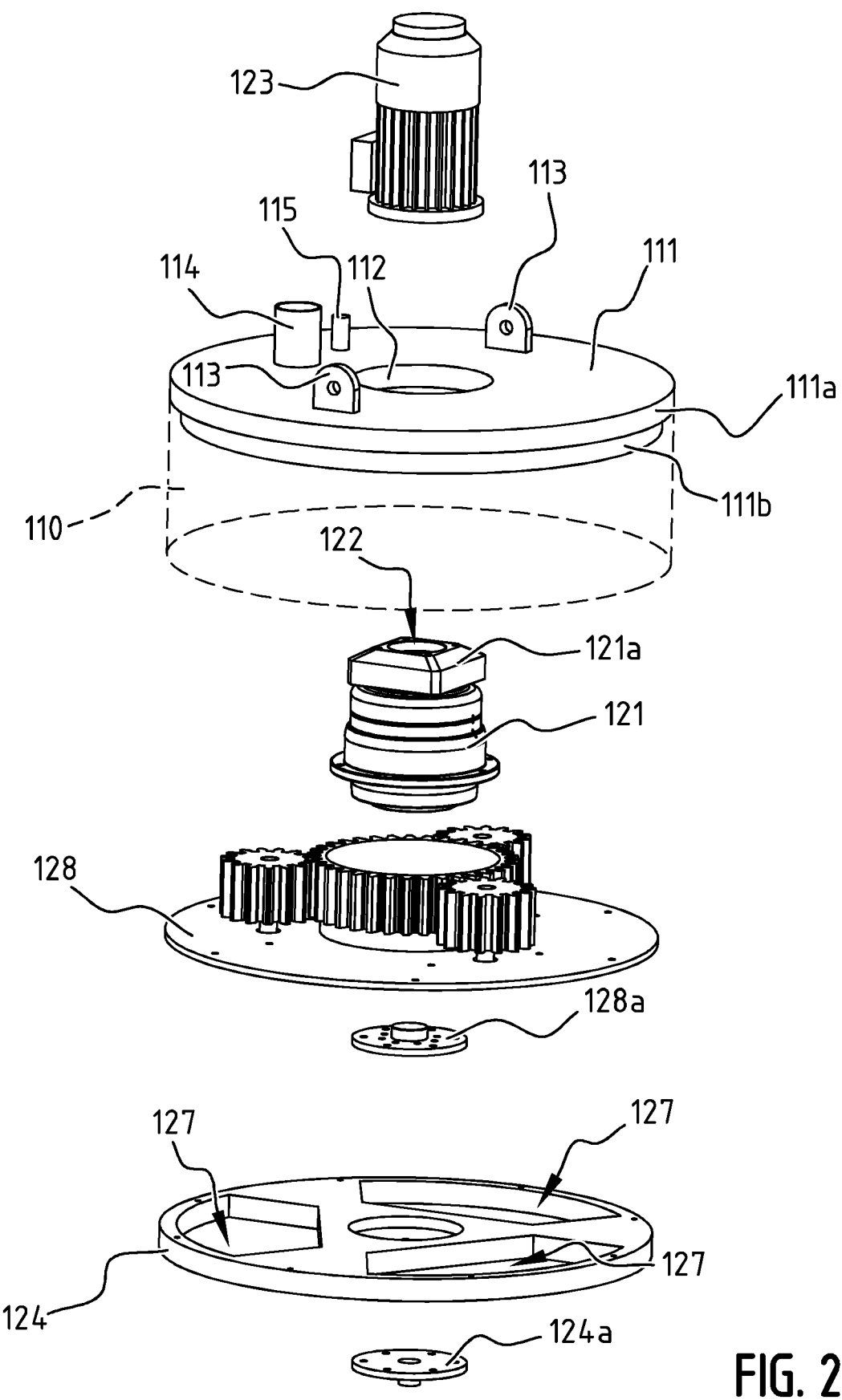
Figure 3A:
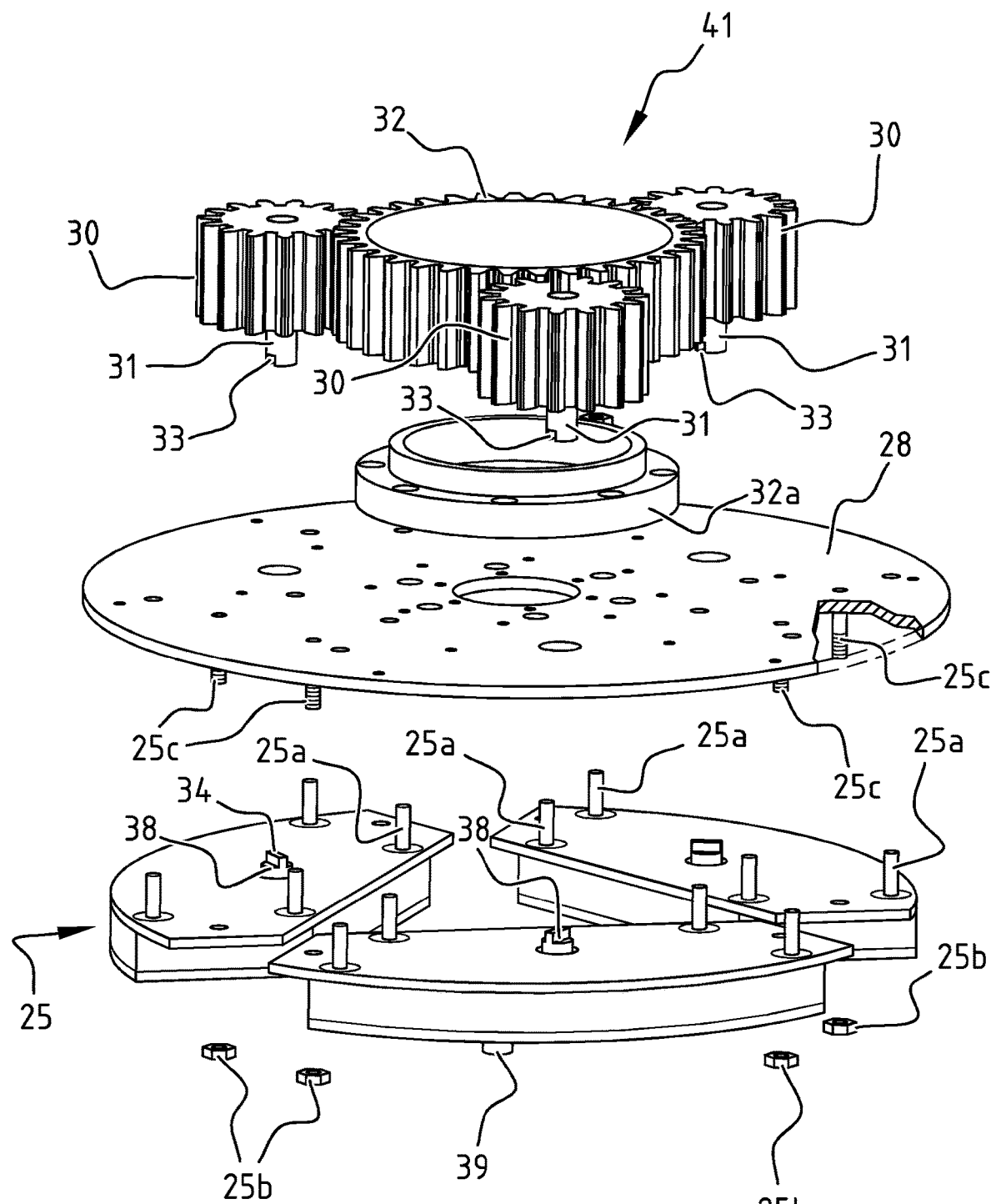
Figure 3B:
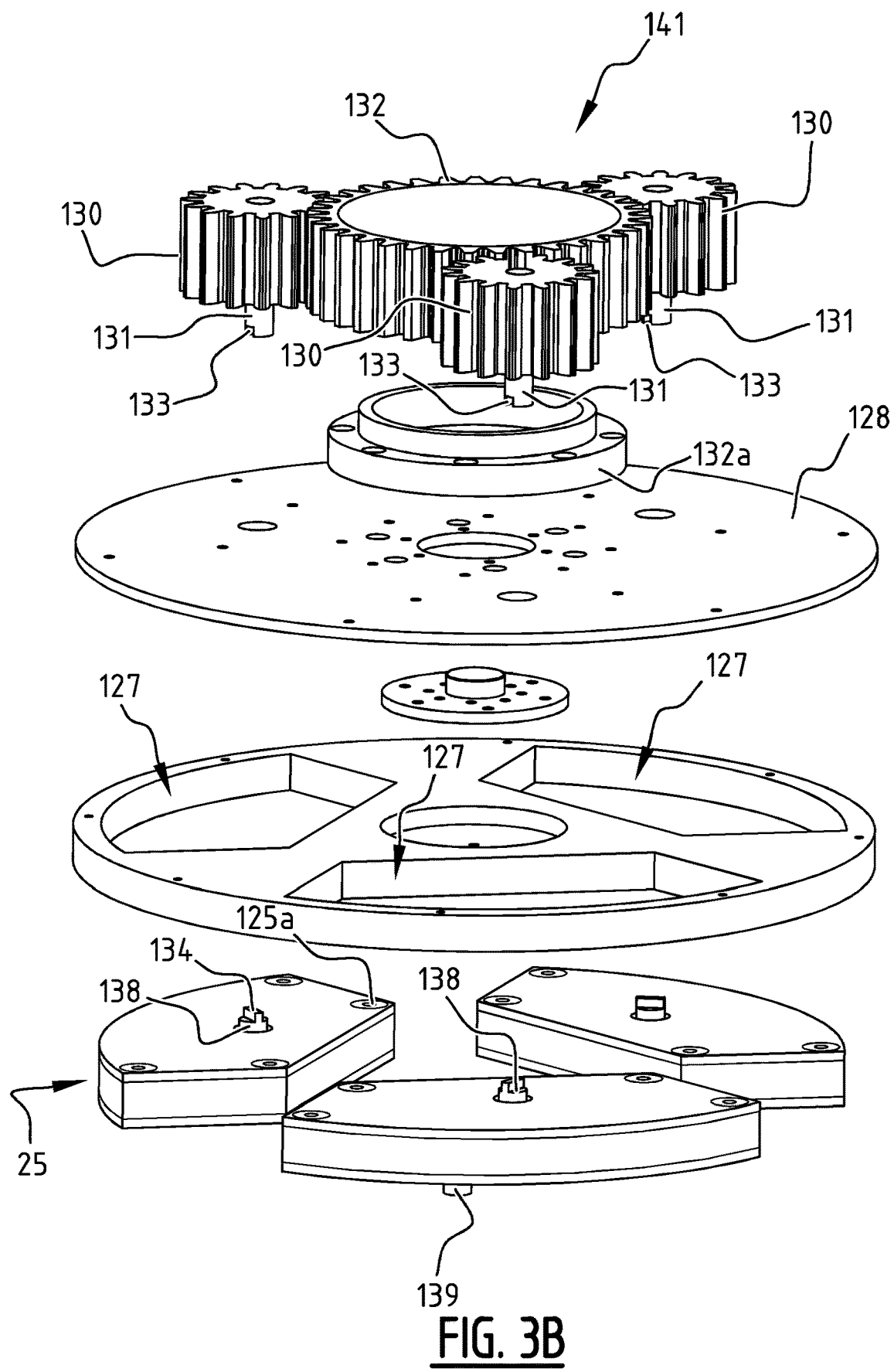
Figure 4A:
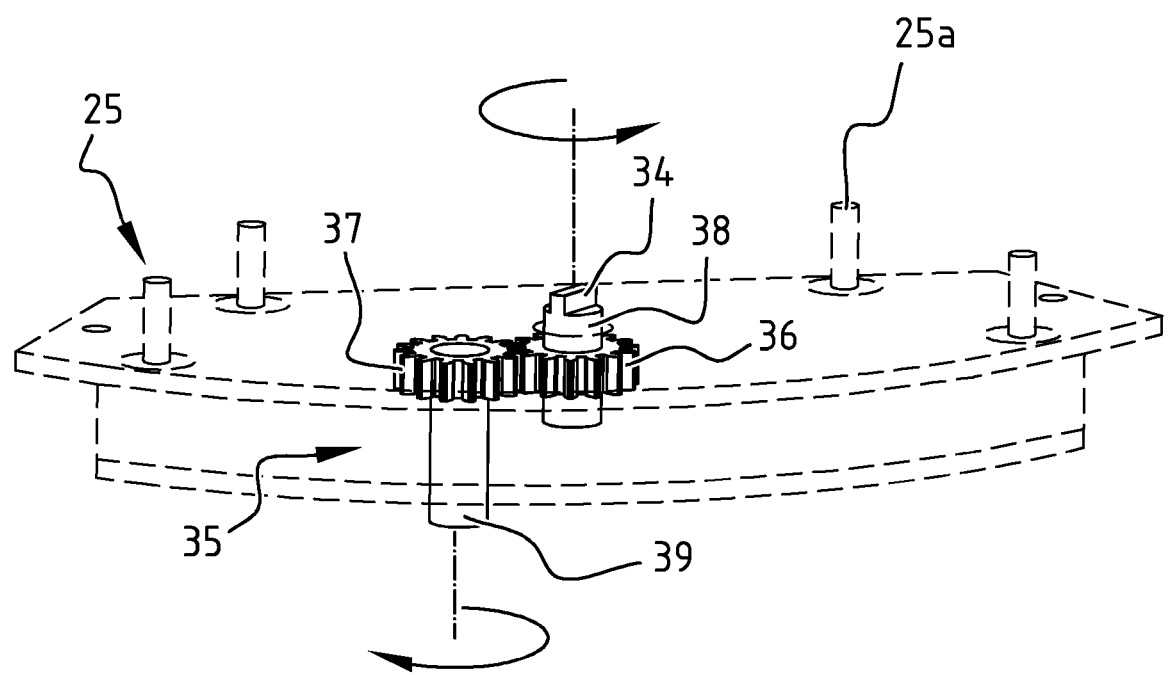
Figure 4B:
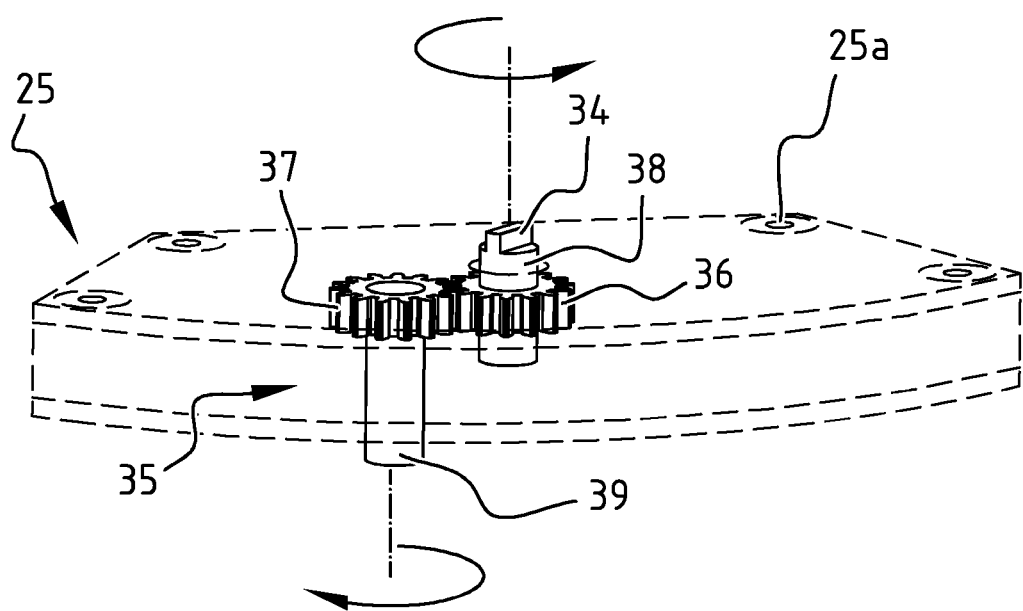
Figure 6A:
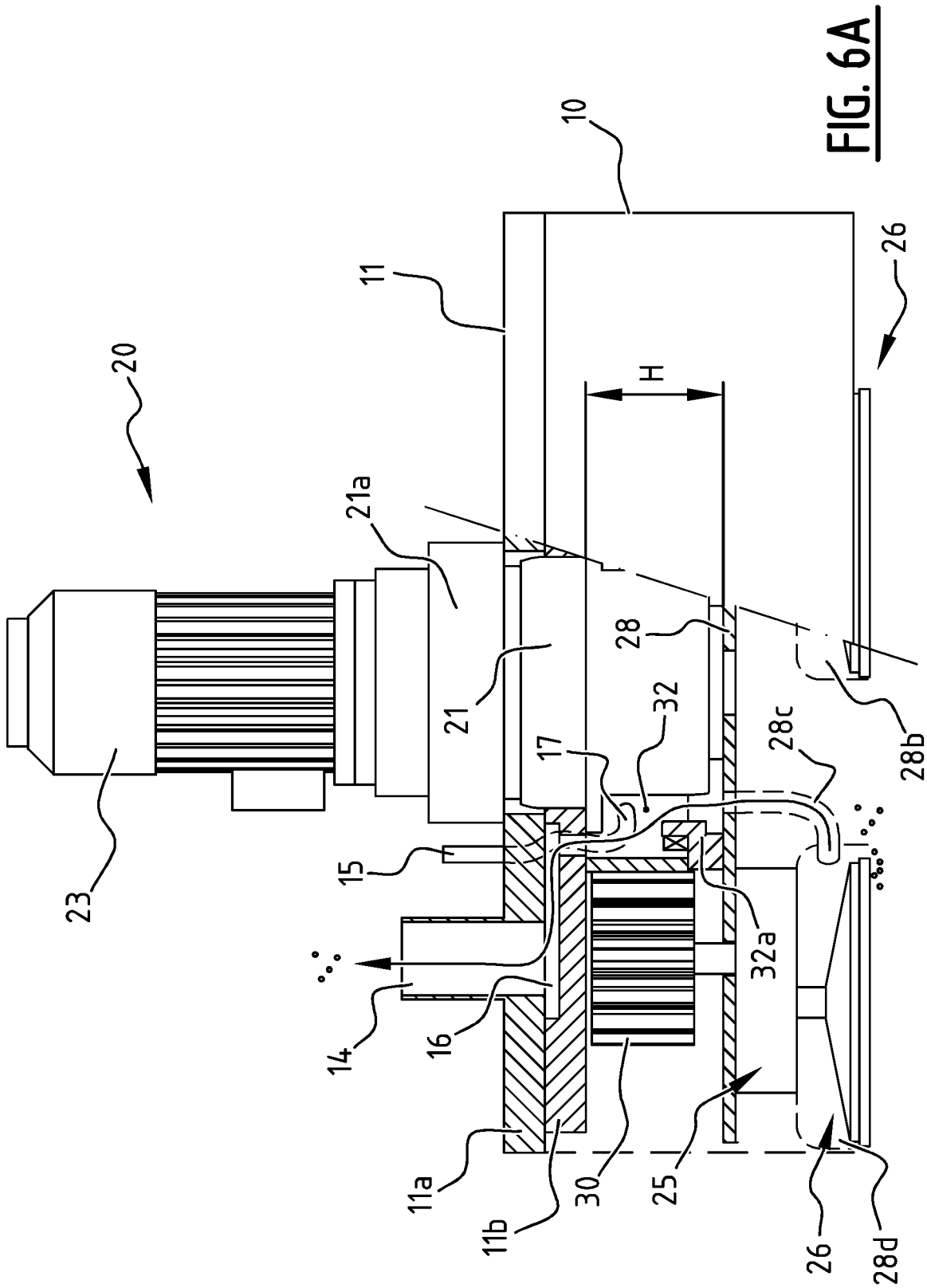
Figure 6B:
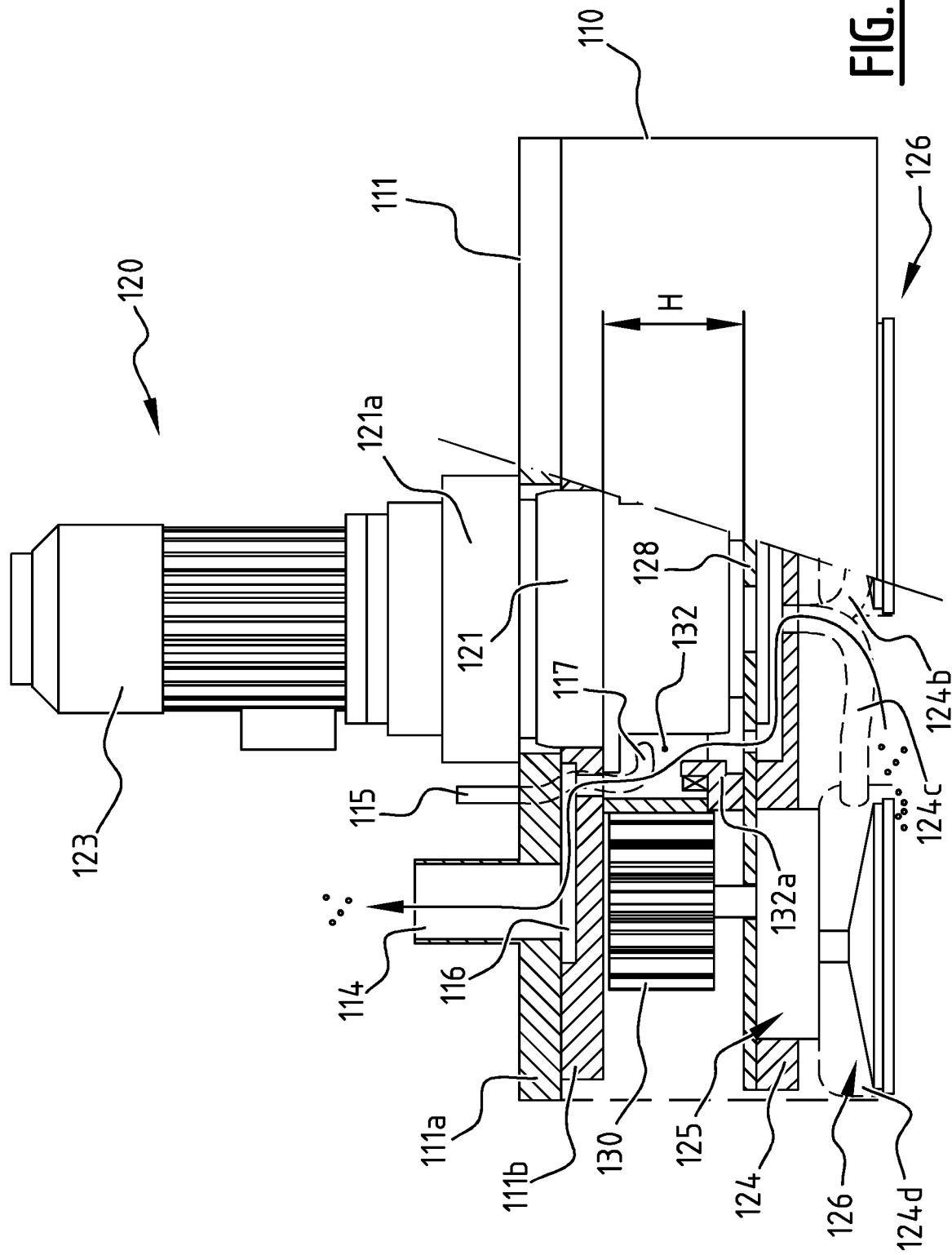
Figure 7:
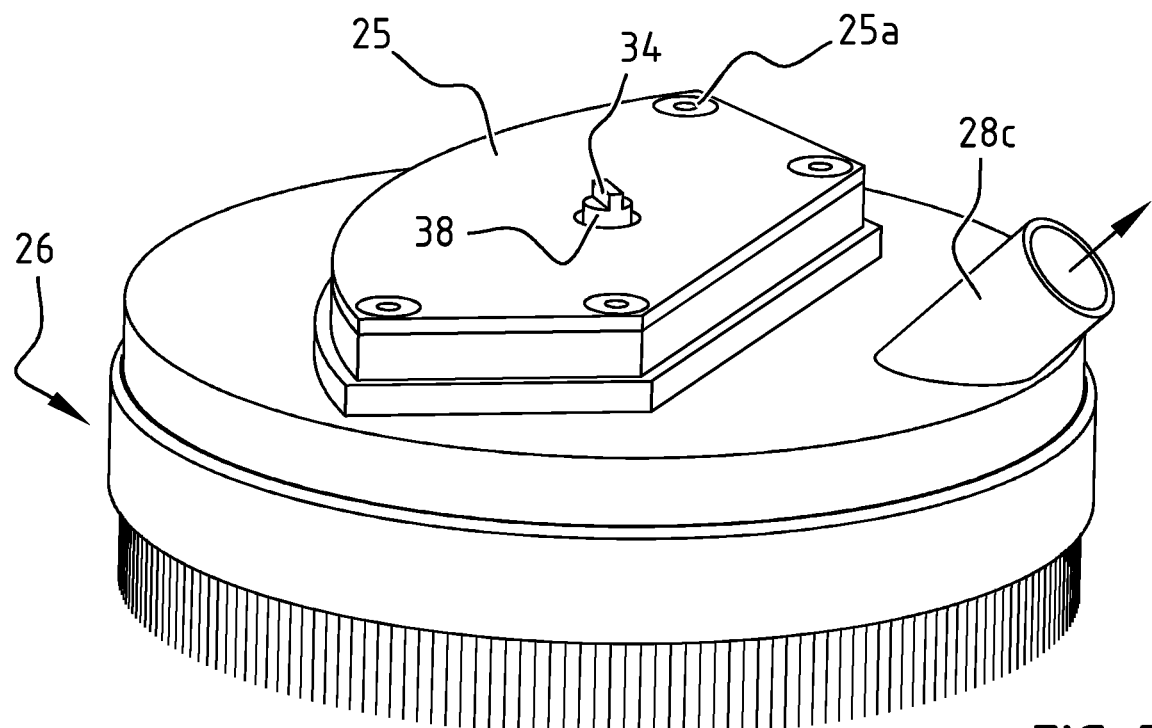
Figure 8:
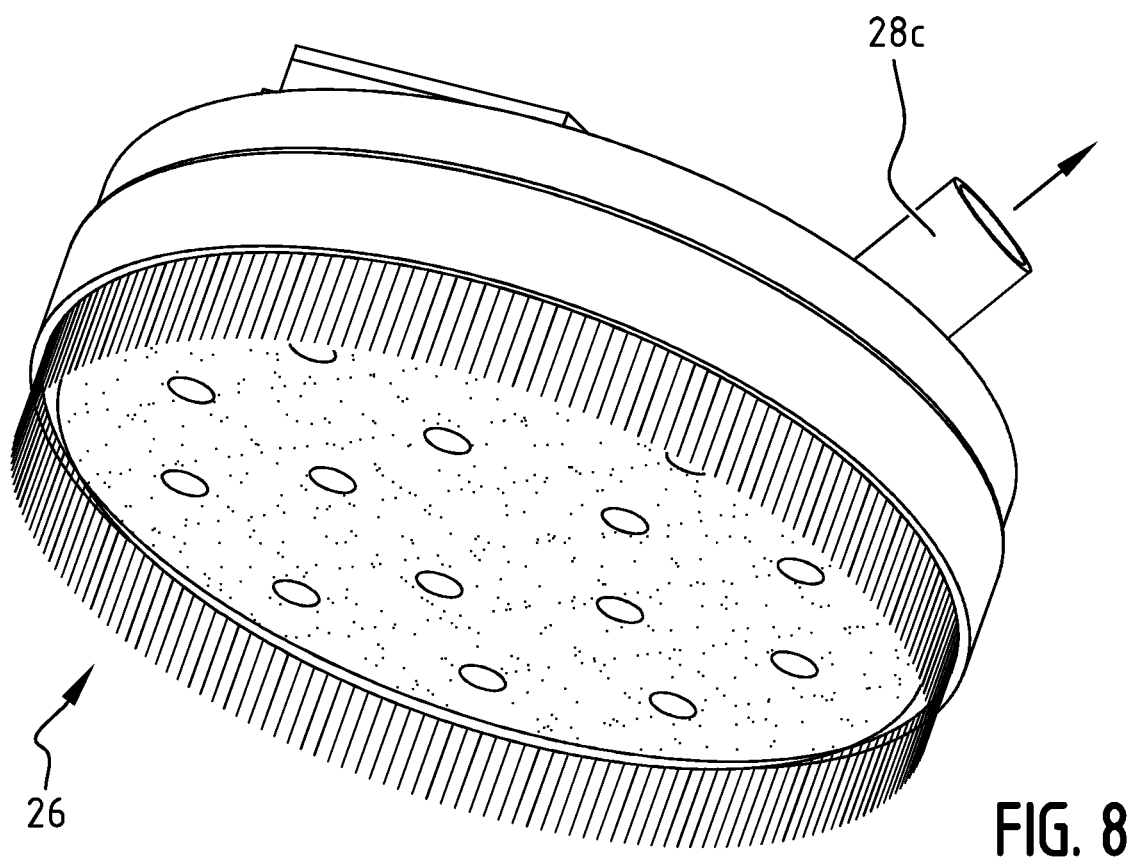

The present invention is further elucidated on the basis of the following figures which show preferred embodiments thereof and are not intended to limit the scope of protection of the invention in any way, wherein:

FIG. 1 shows a perspective side view of an example of the floor treatment apparatus according to the present invention;

FIG. 2*a* shows an exploded view of part of the drive system of the floor treatment apparatus as shown in FIG. 1;

FIG. 2*b* shows an exploded view of part of the drive system of a second example of the floor treatment apparatus according to the present invention;

FIG. 3*a* shows an exploded view of a lower part of the drive system of an example of the floor treatment apparatus of FIG. 1;

FIG. 3*b* shows an exploded view of a lower part of the drive system of an example of the floor treatment apparatus of FIG. 2*b*;

FIG. 4*a* shows a perspective view of an example of the coupling member according to the present invention;

FIG. 4*b* shows a perspective view of a second example of the coupling member according to the present invention;

FIGS. 5*a*-5*h* show schematic views of examples of configurations of the coupling member according to the invention;

FIG. 6*a* shows a cross-sectional view of the floor treatment apparatus of FIG. 1;

FIG. 6*b* shows a cross-sectional view of a second example of the floor treatment apparatus according to the present invention;

FIGS. 7 and 8 shows perspective views of an example of a lower part of the floor treatment apparatus according to the invention.

Floor treatment apparatus 1 comprises a housing 10 and a drive system 20 (see FIG. 1). Housing 10 has a top plate 11, which is provided with connecting means 13 to connect housing 10 to transport means 2. In this example according to the invention (see FIG. 1) transport means 2 comprises cart 2. It will be understood that other configurations/embodiments for transport means 2 can also be envisaged by the skilled person.

Housing 10 in this example further also comprises a weight balancing system 6 comprising support mount 6*a* and a number of weight elements 6*b*. The weight elements 6*b* are removable placed on support mount 6*a* and the number and specific weight of the various elements 6*b* can be adapted. This may for example mean that the number of elements and/or the weight of individual elements may be varied. As a result, the pressure exerted on the treatment members and, consequently, the floor to be treated, can be adapted to the specific circumstances of the situation. It is noted that weight balancing system 6 is not essential to the invention and may be obviated.

Top plate 11 contains a number of openings 12, 14, 15 for various purposes. Dust opening 14 is an opening through which dust from treatments such as grinding, polishing and cleaning can be removed via hose 4 to a dust container 3. Water opening 15 is connectable to a water supply for supplying water to apparatus 1. Water is for example supplied for wet grinding or cleaning of a floor. Opening or aperture 12 is configured for receiving a transmission 21 as explained below.

In this example according to the invention (see FIG. 1) top plate 11 has two connected layers 11*a*, 11*b*. The top layer 11*a* is a solid (single piece) plate 11*a* which is provided with the connecting means 13 and the mentioned openings 12, 14, 15. The bottom layer 11*b* in this example also comprises a single piece, which has a nearly similar shape and surface as top layer 11*a*. Bottom layer 11*b* may also consist of two pieces that together have a nearly similar shape and surface as top layer 11*a*. Bottom layer 11*b* is provided with flow channels 16, 17 (see FIG. 6). Flow channel 16 extends from dust opening 14 to a hollow opening 41 in gear 32. Flow channel 17 is a water channel that extends from water opening 15 to the hollow opening 41 in gear 32. The transfer of both dust and water is governed by transfer housing 32*a*, which is preferably of plastic. Transfer housing 32*a* closely cooperates with gear 32 for forming a channel for channelling dust, which preferably operates under near vacuum or vacuum. To that end, transfer housing 32*a*, gear 32 and flow channel 16 are preferably sealed to form an air tight connection. Transfer housing 32*a* and hollow opening 41 of gear 32 in this example together form the tubular casing. It is noted that the channelling of air/dust also creates a cooling effect on the grinding and/or sanding material that is used. Furthermore, it reduces the temperature of the reductor in the hollow gear 32. As a result, the lifespan of the grinding and/or sanding material and/or the reductor is prolonged.

The drive system 20 comprises a motor 23 that is operatively coupled to a transmission 21. In this example of the invention, an adapter 21*a* is provided between the motor 23 and the transmission 21 (see FIG. 1, FIG. 2*a*, FIG. 2*b*, FIG. 6). Adapter 21*a* may have a square form as shown in FIG. 1, yet may also have a different form, such as a circular or elliptical form. In this example, both the motor 23 and the transmission 21 are arranged above and/or on top of the top plate 11 of the housing 10. Alternatively, transmission 21 may (partially) extend into housing 10. Transmission 21 has a transmission shaft 22 that extends into housing 10 by passing through the aperture 12 in the top plate 11 (see FIG. 2a, FIG. 2b). The drive system 20 further comprises a rotatable plate 28, which in this example is made of aluminium, and which is attached to transmission shaft 22 inside housing 10 (see FIG. 2a, FIG. 3a). Rotatable plate 28 is thus positioned below the top plate 11 and at a distance between H thereof (see FIG. 6). In this example, rotating plate 28 and transmission shaft 22 are directly connected to each other (see FIG. 2). However, the connection between rotatable plate 28 and transmission shaft 22 can also be made by means of a (steel or aluminium) connector plate.

In a second example (see FIG. 2b, FIG. 3b). Drive system 120 comprises sealing plate 128, which in this example is made of steel (yet may also be aluminium), and which is attached to transmission shaft 122 inside housing 110 (see FIG. 2b, FIG. 3b). Rotatable plate 124 is connected to a bottom side of sealing plate 128. The connection between plate 124 and sealing plate 128 is formed by connector 124a, which in this example is a metal plate 124a having a central opening (see FIG. 2b). Furthermore, a central portion of the upper surface of plate 124 is provided with a dish-shaped indentation (not shown) having a central opening. The central opening of the dish-shaped indentation and the central opening of the metal plate 124a line up when the plate 124 is connected to apparatus 1. The bottom side of the plate 124 is provided with a number of openings 127 or compartments 127 in which coupling members 25 can be attached. In this example, three compartments 127 are provided in plate 124. It is noted that compartments 127 are delineated (and in this case closed off) on the upper side by steel sealing plate 128 when the apparatus is assembled.

With reference to FIGS. 2a and 3a, the drive system 20 comprises a gear assembly 30, 32 that is positioned between the top plate 11 and the rotatable plate 28. Between the gear assembly 30, 32 and rotatable plate 28 bearings are preferably provided. In this example, the apparatus comprises three outer or planet gears 30. Each planet gear 30 is positioned above rotatable plate 28 on an axle 31. These outer gears 30 are connected to a larger gear 32 that is centrally mounted under the electric motor 23. The body of the larger central gear 32 is hollow so that transmission shaft 22 can extend through central gear 32. Flow channels 16, 17 also emanate in the opening 41 of hollow body of gear 32. The axles 31 of the three outer gears 30 extend through rotatable plate 28 and each is connected to a coupling member 25. To this end, each axle 31 has a saw cut 33 for receiving a projection 34 of shaft 38 of a coupling member 25 therein. In this embodiment, the coupling members 25 are thus driven by the outer gears 30 so that they rotate relative to the rotating plate 28. Alternatively, the coupling members 25 can be attached to the rotatable plate 28 without being connected to the outer gears 30. Coupling members 25 can be coupled to rotatable plate 28 using a wide variety of connecting means. This includes metric fastenings, magnetic couplings, bolts, holding pins etc. The coupling members 25 are each arranged to couple a treatment member 26 thereto. Treatment members 26 are each arranged for treating said floor surface by engagement on said floor surface. Treatment members 26 are designed such that they meet the requirements of intended treatment process and the characteristics of the floor surface. As explained in further detail below, treatment members 26 are chosen in conjunction with a specific coupling member 25 for performing the treatment to be performed.

With reference to FIGS. 2b and 3b, it is noted that drive system 120 has a similar construction as in the first example (see FIG. 2a, FIG. 3a). Drive system 120 comprises gear assembly 130, 132 that is positioned between the top plate 111 and sealing plate 128. Between the gear assembly 130, 132 and sealing plate 128 bearings are preferably provided.

In this example, the apparatus comprises three outer or planet gears 130. Each planet gear 130 is positioned above sealing plate 128 and rotatable plate 124 on an axle 131. These outer gears 130 are connected to a larger gear 132 that is centrally mounted under the electric motor 123. The body of the larger central gear 132 is hollow so that transmission shaft 122 can extend through central gear 132. Flow channels 116, 117 also emanate in the opening 141 of hollow body of gear 132. The axles 131 of the three outer gears 130 extend through sealing plate 128 and rotatable plate 124 and are each connected to a coupling member 25. To this end, each axle 131 has a saw cut 133 for receiving a projection 134 of shaft 138 of a coupling member 25 therein. In this embodiment, the coupling members 25 are thus driven by the outer gears 130 so that they rotate relative to the sealing plate 128 and rotating plate 124. Alternatively, the coupling members 25 can be attached to the rotatable plate 124 without being connected to the outer gears 130. Coupling members 25 can be coupled to rotatable plate 124 using a wide variety of connecting means. This includes metric fastenings, magnetic couplings, bolts, holding pins etc.

In an alternative embodiment, connector 24a has a diameter equal to the diameter of plate 24, and connector 24a is provided with openings in which coupling members 25 can be positioned. The connector 24a can in this alternative embodiment comprise additional quick releases that can be used to secure coupling member 25 in opening 27. This may for example comprise a slider.

To that end, coupling member 25 can be provided in various different embodiments, each of which is adapted to one or more specific types of floor treatment. In a preferred embodiment, the coupling members are provided with a transmission 35, which may comprise two or more gears. In a first example of a geared coupling member 25 according to the invention (see FIGS. 4a, 4b), the geared coupling member 25 an input gear 36 and an output gear 37, wherein a projection 34 of shaft 38 of the input gear 36 is attached to the saw cut 33 of the axle 31 of the outer gear 30 and a shaft 39 of the output gear 37 is attached to the treatment member 26. In this way, the treatment member 26 can be driven to rotate relative to the coupling member 25. By varying the size and location of the gears in the coupling member 25, various configurations can be achieved. This means that the direction of rotation, the rotational speed and the rotation centre of the treatment member 26 are adapted to provide the desired output for a process to be performed. It will be understood that further examples of such configurations are possible. For example, apparatus configurations can be obtained, wherein:

- a single treatment plate with three coupling members 25 attached thereto is mounted on the rotatable plate, i.e. a so-called single-disc apparatus. The direction of rotation and the rotational speed of the transmission shaft 22 is thereby followed;
- three coupling members 25 with mounted treatment members 26 mounted directly on the rotatable plate 28 without being connected to the outer gears 30. In this case, the coupling members 25 also follow the direction of rotation and the rotational speed of the transmission shaft 22;

the coupling members 25 are connected to the outer gears 30, wherein the outer gears 30 follow the direction of rotation of the transmission shaft 22. Different transmission ratios allow different speeds, depending on the outer circumference of the selected central gear 32 and that of the outer gears 30;

the coupling members 25 are connected to the outer gears 30, wherein the outer gears 30 rotate in a rotation direction opposite to the direction of rotation of the transmission shaft 22. Again, different transmission ratios allow different speeds, depending on the outer circumference of the selected gears 30, 32;

the treatment members 26 are driven by friction between the treatment members 26 and the surface of the floor to be treated. In this way, they can rotate relative to the coupling members 25 regardless of the drive system.

It will be understood that further examples, optionally including combinations of the aforementioned examples can also be envisaged in according with the present invention. In addition, the examples provided below (with reference to the FIGS. 5*a*-5*g*) show different configurations in more detail.

Because the location of the rotation axes of the treatment members 26 is adjustable, it provides for changing the active area without changing the total width of the machine.

As discussed, the treatment members 26 are mounted on coupling members 25 specially developed for its intended treatment purpose. To couple coupling members 25 with rotating plate 28 (or alternatively rotating plate 124) different technical solutions can be used. In an embodiment, rotating plate 28 may have bolts 25*c* on a bottom surface thereof, which extend downwardly and are configured to extend into or through openings in coupling members 25, wherein coupling members 25 are secured to rotating plate 28 using associated nuts 25*b* which are provided on bolts 25*c* (see FIG. 3*a*). In an other embodiment, the coupling members 25 may have magnets 25*a* on their top sides so that they can easily be placed and changed on the steel sealing plate 28 (see also FIG. 3*b*). In the illustrated embodiment plate 124 has a diameter in the range of 400-500 mm. The magnets 25*a* may be positioned on coupling members 25 and/or on plate 124. It will be understood that alternative or additional quick-release systems can also be envisaged in accordance to the present invention. In this example, additional guiding pins 25*a* are provided, which extend upwardly from a top surface of rotating plate 28 and are configured for guiding rotating plate 28 and coupling members 25 such that they connect.

With reference to FIGS. 4 to 6, the coupling members 25 can be of different design, i.e. depending on the intended application, i.e. the intended treatment process and the properties of the floor surface.

The coupling members 25 can be static members. In this case, coupling members 25 are only a static connecting element between the treatment member 26 and the rotating plate 28. In this way, the treatment member 26 follows the direction of rotation and the rotational speed of the rotating plate 28.

Furthermore, the coupling member 25 can have a built-in bearing 40, which allows the treatment member 26 to obtain an extra rotational speed relative to the coupling member 25 due to friction between the treatment member 26 and the surface of the floor to be treated.

Furthermore, the coupling member 25 can be coupled in a dynamic manner, that is to say, the coupling member 25 has a continuous shaft 34 which can be coupled at the bottom to an axle 31 of one of the three outer gears 30 and therewith rotate at a higher or lower speed the rotating plate 28. The direction of rotation of the coupling member 25 can be the same as or opposite to that of the rotating plate 28.

Finally, as discussed above, the coupling members 25 can also contain a further transmission 35 in their interior. This enables different configurations with regard to direction of rotation, rotational speed and position of the rotation axes of the treatment members 26 being attached to said transmission.

Given the open gear system in the housing 10, it is important to prevent dust from entering the gears. This is realized by dust extraction through the centre part of the plate 28. Preferably, plate 28 is provided with a connector 28*b* for connecting dust extraction lines 28*c*.

In the shown example (FIG. 6*a*) dust extraction lines 28*c* emanate in a dust cover 28*d* which is positioned over treatment member 26. In use of the apparatus 1, dust is created at member 26 and subsequently removed via cap 28*d*, extraction line 28*c* and connector 28*b* to opening 41, and subsequently out of the housing 10 via flow channel 16 and dust opening 14. The dust opening 14 as referred to earlier, is preferably connected via a hose 4 to container 3. Although cap 28*d* may be a stationary element with respect to plate 28, it is preferred that cap 28*d* is (fixedly or releasably) connected to plate 28. A very favourable effect of this configuration using caps 28*d* is that the near vacuum condition is close to the treatment members 26 and therefore a minimal amount of dust will escape. This is also favourable for health-related aspects and to prevent unpleasant side-effects of, for example, sanding activities.

It is noted that other options for the dust removal may also be possible. Dust removal may for example be provided by using three openings that are positioned near a centre part of rotating plate 28, and preferably with each opening in line with one of outer gears 30. In addition, or alternatively, dust connector 28*b*, dust extraction lines 28*c* and/or cap 28*d* may be obviated without significantly reducing the effectiveness of the dust extraction. It has been found that a central dust extraction opening in rotating plate 28 may also be effective.

In the shown second example (FIG. 6*b*) dust extraction lines 124*c* emanate in a dust cover 124*d* which is positioned over treatment member 126. In use of the apparatus 1, dust is created at member 126 and subsequently removed via cap 124*d*, extraction line 124*c* and connector 124*b* to opening 141, and subsequently out of the housing 110 via flow channel 116 and dust opening 114. The dust opening 114 as referred to earlier, is preferably connected via a hose to container. A very favourable effect of this configuration is that the near vacuum condition is close to the treatment members 126 and thus extends over the entire dust removal system formed by the various channels in the apparatus. As a result, a minimal amount of dust will escape. This is also favourable for health-related aspects and to prevent unpleasant side-effects of, for example, sanding activities. In addition, through the same channel of dust extraction, the transport of liquids can also be realized, whereby water is applied centrally during wet sanding, and/or grinding thereby reducing sanding dust and/or grinding dust and improving the efficiency of sanding tools.

It is noted that the terms grinding and sanding are used interchangeably in the application with respect to the floor treatment to be performed.

In use of the apparatus 1, water is provided via opening 15 on the housing 10 and is flowed through flow channel 17 to opening 41 of central gear 32. Subsequently, the water is provide from the side under the rotating plate 28 or seeps through holes in the rotating plate 28.

For treating a floor, apparatus 1 is brought to the desired location and the required treatment members 26 are attached to coupling members 25. Appropriate settings are chosen, such as frequencies. Next, the floor is treated.

A number of examples of geared coupling member configurations is provided in the following examples, with specific reference to the FIGS. 5a-5g. In each of the mentioned examples, the motor 23 has a nominal torque of 14.4 Nm at a rated speed of 1500 rpm. The gearbox had an output of 144 Nm and a rotational speed of 150 rpm. The apparatus 1 was provided with a planetary transmission comprising a (sun) gear 32 having 40 teeth and three (planetary) gears 30, each having 15 teeth for a transmission ratio of 1:2.66667. As a result, the planetary gears 30 provided an output of 53 Nm and a rotational speed of 400 rpm at the rated speed and the nominal torque. The output provided by planetary gears 30 had a similar rotational direction as the drive plate. It is noted that the skilled person would understand that other configurations are also possible, which including providing other transmission ratios.

Figure 5A:
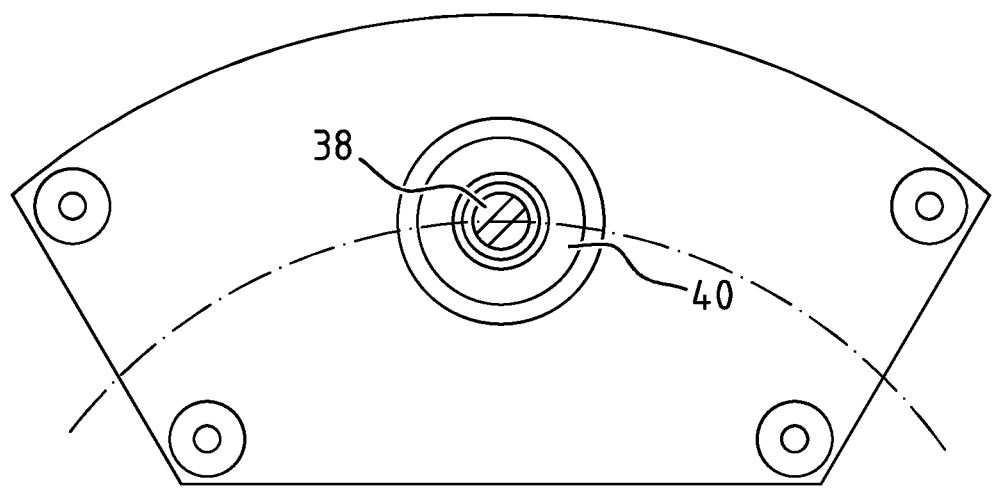
Figure 5B:
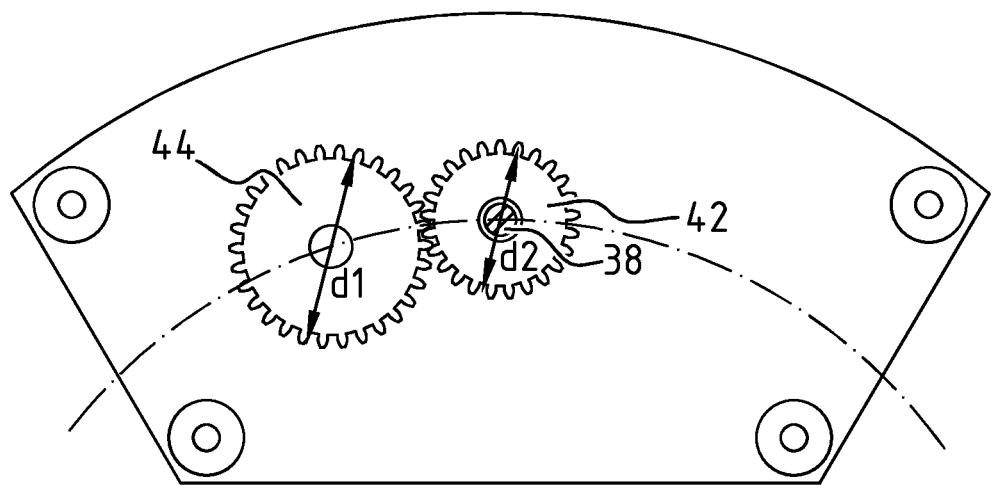

In a second example of a geared coupling member 25 (as shown in FIG. 5a), shaft 38 is coupled to gear 30 with projection 34, whereas the other end is coupled to treatment member 26. No additional gears are provided in the coupling member 25. Furthermore, shaft 38 is provided with bearing 40. The output of the apparatus 1 is in this configuration as follows:
- torque: 53 Nm;
- rotational speed: 400 rpm
- rotation direction: identical to drive plate
- number of output axles: 3
- radial location of output axles compared to radial location of input axles (viewed from central opening of in plates 28, 28a): equal The configuration as provided in this example provides excellent results for sanding and polishing wooden floors and can also be used for sanding (natural) stone floors and/or concrete floors. Furthermore, the configuration according to this example is excellent for cleaning treatments including the removal of wax layers and the preparation of floors, such as floor buffing.

In a third example of a geared coupling member 25 (as shown in figure Sb), shaft 38 is coupled to gear 30 with projection 34 and is also coupled to gear 42. Gear 42 has a diameter d1 and is configured to cooperate with the gear 44, which has a diameter d2. Gear 44 is coupled to treatment member 26. Also visible is input shaft 38 which is provided with bearing 40. The output of the apparatus 1 is in this configuration as follows:
- torque: 53 Nm;
- rotational speed: 400 rpm
- rotation direction: opposite to rotation direction of drive plate
- number of output axles: 3
- radial location of output axles compared to radial location of input axles (viewed from central opening of in plates 28, 28a): equal The configuration as provided in this example provides excellent results for sanding and polishing wooden floors and can also be used for sanding (natural) stone floors and/or concrete floors. Furthermore, the configuration according to this example is excellent for cleaning treatments including the removal of wax layers and the preparation of floors, such as floor buffing.

Figure 5C:
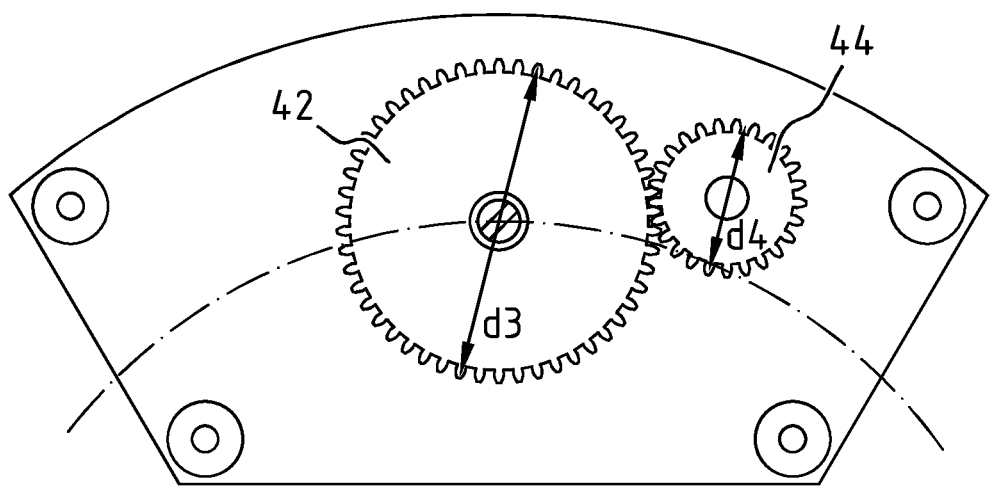

In a fourth example of a geared coupling member 25 (as shown in FIG. 5c), shaft 38 is coupled to gear 30 with projection 34 and is also coupled to gear 42. Gear 42 has a diameter d3 and is configured to cooperate with the gear 44, which has a diameter d4, which is smaller than diameter d3. Gear 44 is coupled to treatment member 26. Also visible is input shaft 38 which is provided with bearing 40. The output of the apparatus 1 is in this configuration as follows:
- torque: 26.5 Nm;
- rotational speed: 800 rpm
- rotation direction: opposite to rotation direction of drive plate
- number of output axles: 3
- radial location of output axles compared to radial location of input axles (viewed from central opening of in plates 28, 28a): radially outward from input axles.

The configuration as provided in this example provides excellent results for polishing (natural) stone floors and concrete floors. This configuration may also be used for cleaning floors with a hard surface, such as stone and concrete.

Figure 5D:
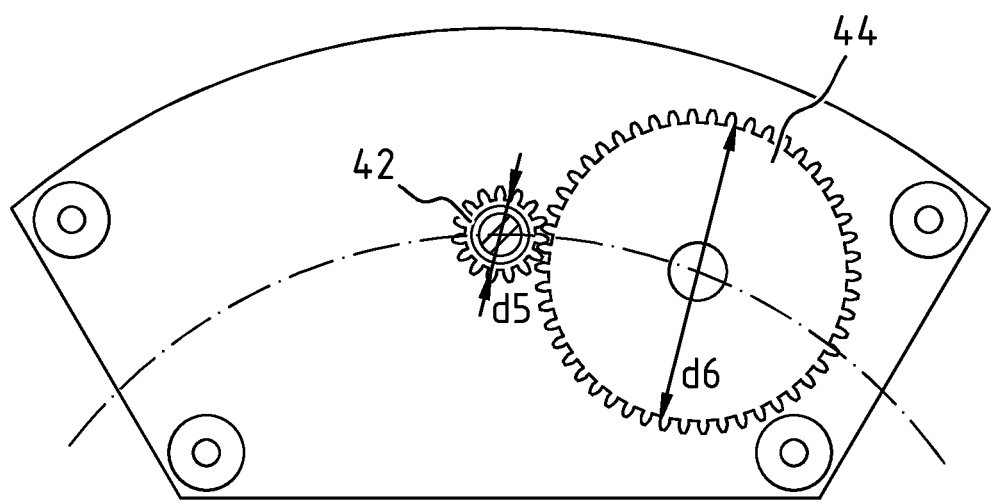

In a fifth example of a geared coupling member 25 (as shown in FIG. 5d), shaft 38 is coupled to gear 30 with projection 34 and is also coupled to gear 42. Gear 42 has a diameter d5 and is configured to cooperate with the gear 44, which has a diameter d6, which is significantly greater than diameter d5. Gear 44 is coupled to treatment member 26. Also visible is input shaft 38 which is provided with bearing 40. The output of the apparatus 1 is in this configuration as follows:
- torque: 84.8 Nm;
- rotational speed: 240 rpm
- rotation direction: opposite to direction of the drive plate
- number of output axles: 3
- radial location of output axles compared to radial location of input axles (viewed from central opening of in plates 28, 28a): equal The configuration as provided in this example provides excellent results for sanding and polishing wooden floors and is excellent for sanding (natural) stone floors and/or concrete floors under high pressure. Furthermore, the configuration according to this example is excellent for the preparation of floors, such as floor buffing. The configuration according to this example can also be used for cleaning floors.

Figure 5E:
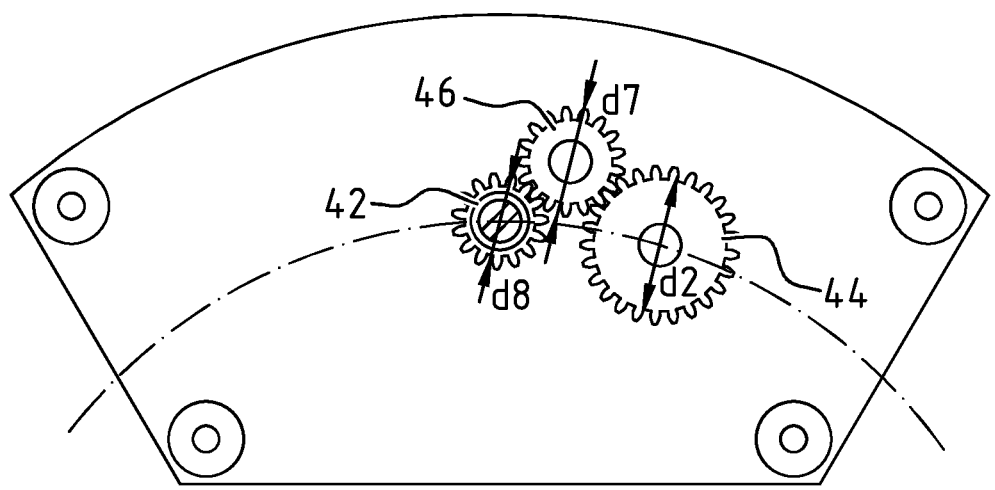

In a sixth example of a geared coupling member 25 (as shown in FIG. 5e), shaft 38 is coupled to gear 30 with projection 34 and is also coupled to gear 42. Gear 42 has a diameter d8 and is configured to cooperate with intermediate gear 46. Gear 46 has a diameter d7, which is comparable to diameter d8. Gear 46 is configured to also cooperate with gear 44, which has a diameter d2, which is significantly larger than both diameter d8 and diameter d7. Gear 44 is coupled to treatment member 26. Also visible is input shaft 38 which is provided with bearing 40. The output of the apparatus 1 is in this configuration as follows:
- torque: 84.8 Nm;
- rotational speed: 240 rpm
- rotation direction: similar to drive plate
- number of output axles: 3
- radial location of output axles compared to radial location of input axles (viewed from central opening of in plates 28, 28a): equal The configuration as provided in this example provides excellent results for sanding and polishing wooden floors and is also excellent for sanding (natural) stone floors and/or concrete floors under high pressure. Furthermore, the configuration according to this example is excellent for the preparation of floors, such as floor huffing. The configuration according to this example can also be used for cleaning floors.

Figure 5F:
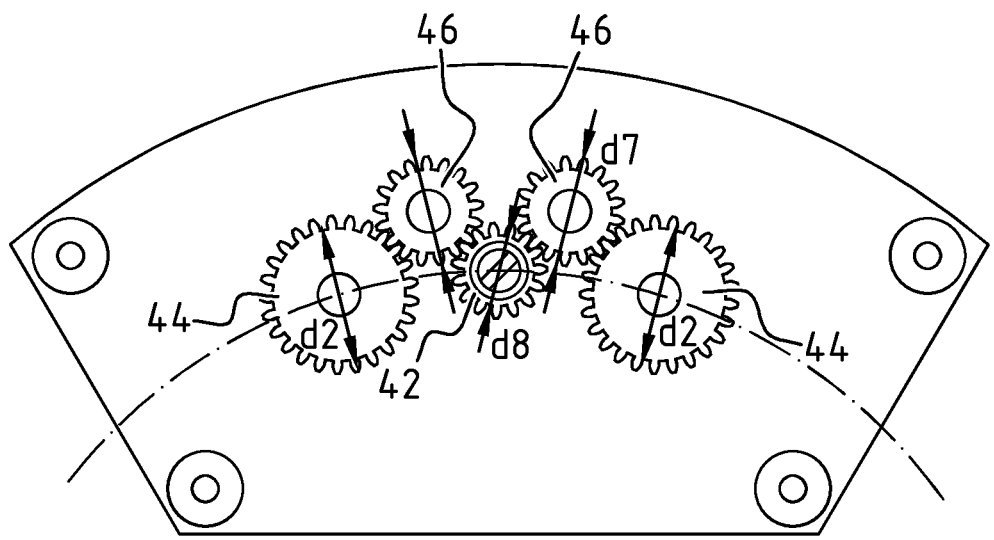

In a seventh example of a geared coupling member 25 (as shown in FIG. 5*f*), shaft 38 is coupled to gear 30 with projection 34 and is also coupled to gear 42. Gear 42 has a diameter d8 and is configured to cooperate with two intermediate gears 46. Gears 46 are placed substantially on opposite sides of gear 42 and have a diameter d7, which is comparable to diameter d8. Each of the gears 46 is configured to also cooperate with one of the gears 44. Each gear 44 has a diameter d2, which is significantly larger than both diameter d8 and diameter d7. Each of the gears 44 is coupled to a treatment member 26. Therefore, the configuration in this example provides two outputs per compartment 27. Also visible is input shaft 38 which is provided with bearing 40. The output of the apparatus 1 is in this configuration as follows:
- torque: 84.8 Nm;
- rotational speed: 240 rpm
- rotation direction: similar to drive plate
- number of output axles: 6
- radial location of output axles compared to radial location of input axles (viewed from central opening of in plates 28, 28*a*): radially outward from input axles.

The configuration as provided in this example provides excellent results for sanding (natural) stone floors and/or concrete floors under high pressure. The configuration according to this example can also be used for cleaning floors.

Figure 5G:
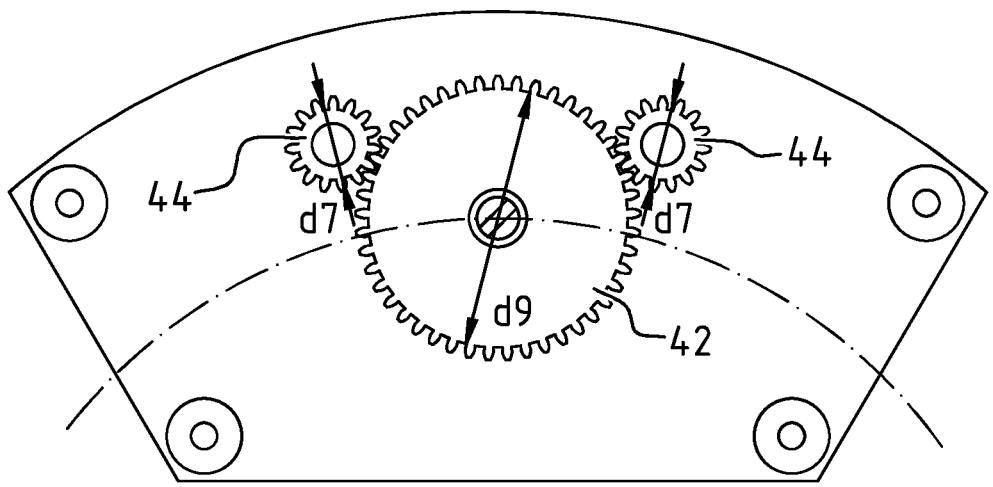

In an eight example of a geared coupling member 25 (as shown in FIG. 5*g*), shaft 38 is coupled to gear 30 with projection 34 and is also coupled to gear 42. Gear 42 has a diameter d9 and is configured to cooperate with each of the two gears 44. Gears 44 each have a diameter d7, which is significantly smaller than diameter d9. Gears 44 are placed on opposite sides of gear 42 and slightly radially outward compared to input shaft 38. The configuration in this example provides two outputs per compartment 27. Also visible is input shaft 38 which is provided with bearing 40. The output of the apparatus 1 is in this configuration as follows:
- torque: 17.7 Nm;
- rotational speed: 1200 rpm
- rotation direction: opposite to direction of drive plate
- number of output axles: 6
- radial location of output axles compared to radial location of input axles (viewed from central opening of in plates 28, 28*a*): radially outward from input axles.

The configuration as provided in this example is specifically designed for cleaning hard floor surfaces.

Figure 5H:
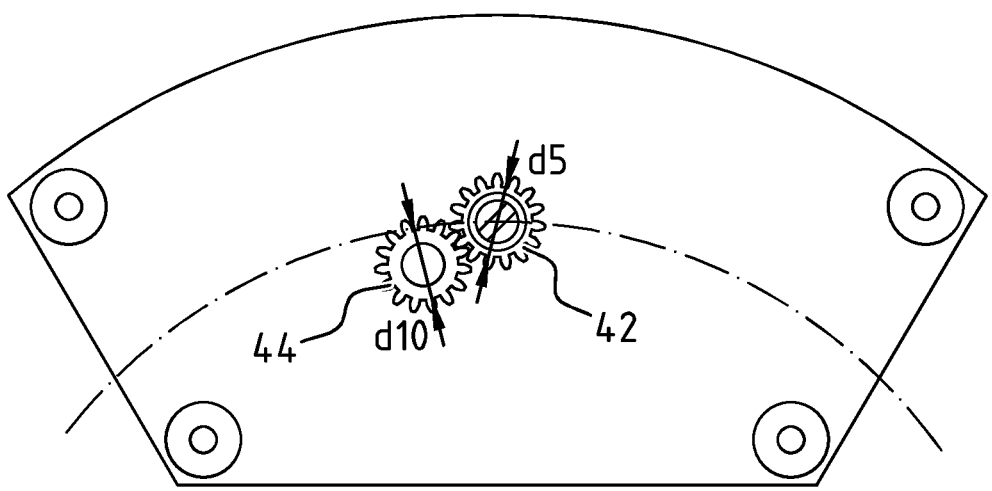

In a ninth example of a geared coupling member 25 (as shown in FIG. 5*h*), shaft 38 is coupled to gear 30 with projection 34 and is also coupled to gear 42. Gear 42 has a diameter d5 and is configured to cooperate with gear 44. Gear 44 has a diameter d10, which is nearly comparable to diameter d5. Also visible is input shaft 38 which is provided with bearing 40. The output of the apparatus 1 is in this configuration as follows:
- torque: 53 Nm;
- rotational speed: 400 rpm
- rotation direction: opposite to direction of drive plate
- number of output axles: 3
- radial location of output axles compared to radial location of input axles (viewed from central opening of in plates 28, 28*a*): radially inward from input axles.

The configuration as provided in this example is excellent for sanding and polishing of wooden floors. It can also be used for cleaning floors including the removal of wax layers from floors.

The present invention is by no means limited to the above described preferred embodiments thereof. The rights claimed are determined by the appended claims within the scope of which many modifications are conceivable. For example, the shape and number of coupling members 25 and/or treatment members 26 can be amended. Also, it would be possible to use only a part of the available coupling members with treatment members in specific applications. Other quick-release systems can also be envisaged, such as springs, hooks etc. as alternatives or in addition to the use of magnets. Treatment members 26 may relate to polishing, sanding, smoothing, cleaning and similar operations.

It is noted that the invention can additionally and alternatively to the abovementioned description also be defined according to the following clauses, which are freely combinable with the embodiments as described in the abovementioned description.

C.1. Floor treatment apparatus comprising:
a housing comprising a top plate, and
a drive system comprising:
- a transmission arranged above the top plate, the transmission comprising a transmission shaft passing through an aperture in the top plate,
- a motor attached to the transmission, the motor arranged above the top plate,
- a rotatable drive plate attached to the transmission shaft and positioned below the top plate, and
- a coupling member attached to a bottom of the drive plate and arranged to couple a treatment member for treating a floor surface, by engagement on said floor surface, to the drive plate, wherein the coupling member comprises a quick release mechanism arranged for releasably attaching the coupling member to the drive plate.

C.2. Floor treatment apparatus according to clause C.1, wherein the quick release mechanism arranged for releaseably attaching the coupling member to the drive plate is arranged for releaseably attaching without the use of attachment tools, and preferably wherein the quick release mechanism comprises a magnetic coupling.

C.3. Floor treatment apparatus according to clause C.1 or C.2, wherein the coupling member is arranged for rotatably attaching the treatment member to the bottom surface thereof, such that the treatment member is rotatable relative to the coupling member around a rotation axis perpendicular to the plane of the drive plate.

C.4. Floor treatment apparatus according to clause C.3, wherein the coupling member comprises bearing means with the interposition of which the treatment member is rotatably attached on the bottom surface of the coupling member.

C.5. Floor treatment apparatus according to clause C.3 or C.4, further comprising:
a sun gear attached to the top of the drive plate and fixed in position relative thereto,
at least one planet gear rotatably attached to top of the drive plate, and
wherein the treatment member is rotatably attached to the bottom of the coupling member by attachment of the treatment member to the planet gear by means of an axle extending from the planet gear through the drive plate and the coupling member to the treatment member, wherein the planet gear engages the sun gear, such that as the drive plate is driven by the transmission shaft, the sun gear rotates the planet gear, thereby rotating the treatment member relative to the coupling member.

C.6. Floor treatment apparatus according to clause C.5, wherein the coupling member comprises a transmission comprising an input gear and an output gear, the input gear comprising an input shaft attached to the sun gear or planet gear and the output gear comprising a shaft attached to the treatment member.

C.7. Floor treatment apparatus according to any one of the preceding clauses, further comprising an open-ended tubular casing extending from a central aperture in the drive plate through the housing to outside the housing, wherein the casing is arranged for a fluid to flow through it.

C.8. Floor treatment apparatus according to clause C.7, further comprising suction means attached to the casing, the suction means being arranged to suck up particles that have come off the floor surface after treatment and to transport them through the casing to outside to the housing.

C.9. Floor treatment apparatus according to clause C.7 or C.8, further comprising fluid supply means attached to the casing, the fluid supply means being arranged to supply fluid to the floor surface to be treated via the casing through the central aperture in the drive plate.

C.10. Floor treatment apparatus according to any one of the preceding clauses, wherein a top surface of the coupling member and/or the bottom surface of the drive plate is at least partially magnetic.

C.11. Coupling member for a floor treatment apparatus according to any one of clauses C.1-C.10, the coupling member being attached to a bottom of a rotatable drive plate of the floor treatment apparatus and being arranged for rotatably attaching a treatment member for treating a floor surface under the drive plate to the bottom surface of the coupling member, such that the treatment member is rotatable relative to the coupling member around a rotation axis perpendicular to the plane of the drive plate.

C.12. Coupling member according to clause C.11, the coupling member comprising a transmission comprising an input gear and an output gear, the input gear comprising an input shaft attached to a sun gear or planet gear being attached to the top of the drive plate of the floor treatment apparatus, and the output gear comprising a shaft attached to the treatment member.

C.13. Method for treating a floor, comprising the steps of:
providing a floor treatment apparatus according to any one of clauses C.1-C.10; and
treating a floor with the floor treatment apparatus.

C.14. Method of clause C.13, further comprising a step of selecting a coupling member of the floor treatment apparatus in accordance with a treatment requirement of the method.

C.15. Method of clause C.14, wherein the coupling member comprises a coupling member according to clause C.11 or C.12.

C.16. Use of a floor treatment apparatus according to any of clauses C.1-C.10 in a method for treating a floor according to any of clauses C.13-C.15.

C.17. Floor treatment apparatus according to any one of the clauses 1-10, wherein the drive plate is provided with a dust cover or dust cap that extends from the drive plate towards a floor to be treated.

The invention claimed is:
1. Floor treatment apparatus comprising:
a housing comprising a top plate, and
a drive system comprising:
a drive system transmission arranged above the top plate, the drive system transmission comprising a transmission shaft passing through an aperture in the top plate,
a motor attached to the transmission, the motor arranged above the top plate,
a rotatable drive plate attached to the transmission shaft and positioned below the top plate, and
a coupling member attached to a bottom of the drive plate and arranged to couple a treatment member for treating a floor surface to the drive plate,
wherein the coupling member comprises a release mechanism arranged for releasably attaching the coupling member to the drive plate, and wherein the coupling member further comprises a coupling member transmission disposed therein, the coupling member transmission comprising an input gear and an output gear, wherein the input gear comprises an input shaft that is operatively connected to the drive system transmission shaft, and wherein the output gear comprises a shaft attached to the treatment member.

2. Floor treatment apparatus according to claim 1, wherein the floor treatment apparatus comprises an open-ended tubular casing extending from a central aperture in the drive plate to an outlet opening of the housing to which a fluid conduit is connectable, wherein the casing is arranged for a fluid to flow through it.

3. Floor treatment apparatus according to claim 2, further comprising suction means attached to the casing, the suction means being arranged to suck up particles and/or dust that have come off the floor surface after treatment and to transport them through the casing to outside to the housing.

4. Floor treatment apparatus according to claim 2, further comprising fluid supply means attached to the casing, the fluid supply means being arranged to supply fluid to the floor surface to be treated via the casing through the central aperture in the drive plate.

5. Floor treatment apparatus according to claim 1, wherein the release mechanism is a magnetic coupling is configured to releaseably attach the coupling member to the drive plate by hand without the use of attachment tools.

6. Floor treatment apparatus according to claim 1, wherein the coupling member is arranged for rotatably attaching the treatment member to the bottom surface thereof, such that the treatment member is rotatable relative to the coupling member around a rotation axis perpendicular to the plane of the drive plate.

7. Floor treatment apparatus according to claim 6, wherein the coupling member comprises bearing means with the interposition of which the treatment member is rotatably attached on the bottom surface of the coupling member.

8. Floor treatment apparatus according to claim 6, further comprising:
a sun gear attached to the top of the drive plate and fixed in position relative thereto,
at least one planet gear rotatably attached to top of the drive plate, and
wherein the treatment member is rotatably attached to the bottom of the coupling member by attachment of the treatment member to the planet gear by means of an axle extending from the planet gear through the drive plate and the coupling member to the treatment member,
wherein the planet gear engages the sun gear, such that as the drive plate is driven by the transmission shaft, the sun gear rotates the planet gear, thereby rotating the treatment member relative to the coupling member.

9. Floor treatment apparatus according to claim 8, wherein the coupling member comprises a coupling member transmission comprising an input gear and an output gear, the input gear comprising an input shaft attached to the sun gear or planet gear and the output gear comprising a shaft attached to the treatment member.

10. Floor treatment apparatus according to claim 1, wherein a top surface of the coupling member and/or the bottom surface of the drive plate is at least partially magnetic.

11. Floor treatment apparatus according to claim 1, wherein the housing additionally comprises a weight balancing system that is mounted on the top plate, wherein the weight balancing system comprises a support mount configured to support weight elements and a number of weight elements that are positioned on the support mount.

12. Floor treatment apparatus according to claim 1, wherein the drive plate is provided with a dust cover or dust cap that extends from the drive plate towards a floor to be treated.

\* \* \* \* \*